United States Patent
Wackerlin et al.

(10) Patent No.: US 12,286,920 B1
(45) Date of Patent: Apr. 29, 2025

(54) SYSTEM AND METHOD FOR DETECTING A FAILED NITROGEN OXIDE SENSOR

(71) Applicant: Caterpillar Inc., Peoria, IL (US)

(72) Inventors: Drew D. Wackerlin, Chillicothe, IL (US); Keerthana Prasad, Peoria Heights, IL (US); Scott A. Wallington, Hopewell, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/778,574

(22) Filed: Jul. 19, 2024

(51) Int. Cl.
  *F01N 3/20* (2006.01)
  *F01N 3/021* (2006.01)

(52) U.S. Cl.
  CPC ........... *F01N 3/208* (2013.01); *F01N 3/2066* (2013.01); *F01N 3/021* (2013.01); *F01N 2250/02* (2013.01); *F01N 2560/026* (2013.01); *F01N 2570/14* (2013.01); *F01N 2610/02* (2013.01); *F01N 2610/102* (2013.01); *F01N 2900/0412* (2013.01); *F01N 2900/0416* (2013.01); *F01N 2900/1402* (2013.01)

(58) Field of Classification Search
  CPC ........ F01N 3/021; F01N 3/2066; F01N 3/208; F01N 2250/02; F01N 2560/026; F01N 2570/14; F01N 2610/02; F01N 2610/102; F01N 2900/0412; F01N 2900/0416; F01N 2900/1402
  USPC .................... 60/274, 276, 295, 297, 301, 311
  See application file for complete search history.

(56) References Cited

U.S. PATENT DOCUMENTS

| | | | |
|---|---|---|---|
| 7,987,661 B2 | 8/2011 | Jung | |
| 9,109,493 B2 | 8/2015 | Lin et al. | |
| 9,388,728 B2 * | 7/2016 | Chandrasekaran | ... F02D 41/222 |
| 10,598,112 B2 | 3/2020 | Zhang | |
| 11,249,061 B2 | 2/2022 | Gong et al. | |
| 11,879,367 B2 | 1/2024 | Webb et al. | |
| 2009/0165543 A1 | 7/2009 | Wakahara | |
| 2016/0186630 A1 * | 6/2016 | Osburn | .................. F01N 11/00 60/277 |
| 2022/0025802 A1 * | 1/2022 | Webb | .................. F02D 41/1463 |

FOREIGN PATENT DOCUMENTS

| | | |
|---|---|---|
| DE | 102016206609 A1 | 10/2017 |
| JP | 6175292 B2 | 7/2017 |

* cited by examiner

Primary Examiner — Jorge L Leon, Jr.

(57) ABSTRACT

The present disclosure is related to detection of a failed NOx sensor, which is crucial for modern combustion engine aftertreatment control, but its failure can cause false diagnostics, reduced engine performance, and lengthy troubleshooting. Accordingly, a system and method for detecting a NOx sensor in an engine through a NOx functional test is disclosed with a selective catalytic reduction SCR system, an ammonia source, a regeneration device, a NOx sensor positioned at an output stream of the SCR system, and an electronic control module in communication with the ammonia source and the NOx sensor. Furthermore, the electronic control module is configured to receive one or more signals from the NOx sensor.

20 Claims, 5 Drawing Sheets

SYSTEM AND METHOD FOR DETECTING A FAILED NITROGEN OXIDE SENSOR

TECHNICAL FIELD

The embodiments described herein are generally directed to failed sensors, and, more particularly, to a system and method for detecting a failed nitrogen oxide sensor.

BACKGROUND

A combustion engine typically operates by igniting a mixture of fuel, such as diesel and air, in a combustion chamber. The energy released during the combustion process is harnessed to power the engine and perform work. During the combustion process, several gases are produced as byproducts of the combustion. These gases include carbon dioxide (CO2), nitrogen oxides (NOx), and water vapor (H2O). While maintenance of the combustion engine ensures the safe operation of internal systems to prevent the release of harmful gases, after-treatment control systems are typically installed to ensure that toxic gases are not released. However, after-treatment NOx sensors can also fail, and therefore, a method and system to detect the failure is needed. NOx sensors are helpful for modern combustion engine after-treatment control, but their failure modes are difficult to detect during normal operation, leading to false detections of other diagnostics, reduced engine performance, and lengthy troubleshooting by servicing technicians.

On the other hand, relying solely on sensor diagnostics to detect NOx sensor failures can be problematic as it may overlook issues like calibration drift or performance degradation under varying operational conditions. This approach could lead to inaccurate emissions data, regulatory non-compliance, and potentially costly environmental repercussions for engine operators. Therefore, while scheduled diagnostic procedures serve as valuable failure detection control, their effectiveness can be untimely and lengthy. A possible solution can be diagnostic devices. However, this option is not always available and proper devices on a worksite may not be feasible. Furthermore, these devices can be costly, and problematic due to their limited ability to assess sensor performance under real-world conditions, including variations in temperature, pressure, and fuel composition.

Accordingly, a system and method for detecting a failed NOx sensor would offer a variety of benefits. Systems for detecting a failed NOx sensor have been used in other contexts. For example, U.S. Pat. No. 11,879,367 describes an NOx sensor diagnostic in heavy-duty motor vehicle engines. U.S. Pat. No. 9,109,493 describes an apparatus and method to diagnose a NOx sensor. However, the mere diagnostic or device to detect NOx sensor failures may not be enough to provide a timely failure detection. The present disclosure is directed toward a system for system and method for detecting a failed NOx sensor through a functional test, in the context of transportation and similar tasks, that overcomes this and other problems discovered by the inventors.

SUMMARY

In an embodiment, a method for detecting a failure state of a nitrogen oxide (NOx) sensor in an engine through a NOx functional test, the method comprises: ceasing to inject ammonia from an ammonia source to a selective catalytic reduction (SCR) system; depleting a remaining ammonia in the SCR system, wherein the depleting of the remaining ammonia alters the exhaust system operating conditions to create a NOx gas output; sensing the NOx gas output through a NOx sensor positioned at the output of the SCR system; transmitting one or more readings of the NOx gas output from the NOx sensor to an electronic control module; and comparing the readings of the NOx gas output to one or more control parameters through one or more processors in the electronic control module.

In an embodiment, a method for detecting a failed nitrogen oxide (NOx) sensor in a diesel engine, the method comprises: ceasing to inject ammonia from an ammonia source to a selective catalytic reduction (SCR) system; depleting a remaining ammonia in the SCR system with a regeneration device; sensing for NOx gas output through a NOx sensor positioned at the output of the SCR system to obtain one or more NOx gas output readings; transmitting the one or more NOx gas output readings to an electronic control module having one or more processors; and comparing the one or more NOx gas output readings from the NOx sensor to one or more predetermined parameters through the one or more processors in the electronic control module.

In an embodiment, a system for detecting a failed nitrogen oxide (NOx) sensor in an engine through a NOx functional test, the system comprises: a selective catalytic reduction (SCR) system; an ammonia source; a regeneration device configured to deplete ammonia in the SCR system; a NOx sensor positioned at an output stream of the SCR system and configured to sense a NOx gas output; and an electronic control module in communication with the ammonia source and the NOx sensor, the electronic control module configured to instruct the ammonia source to cease injecting ammonia into the SCR system; instruct the regeneration device to deplete ammonia in the SCR system; receive one more signals from the NOx sensor, one more signals from the NOx sensor indicating the amount of the NOx gas output; and compare the one or more signals from the NOx sensor to one or more control parameters.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
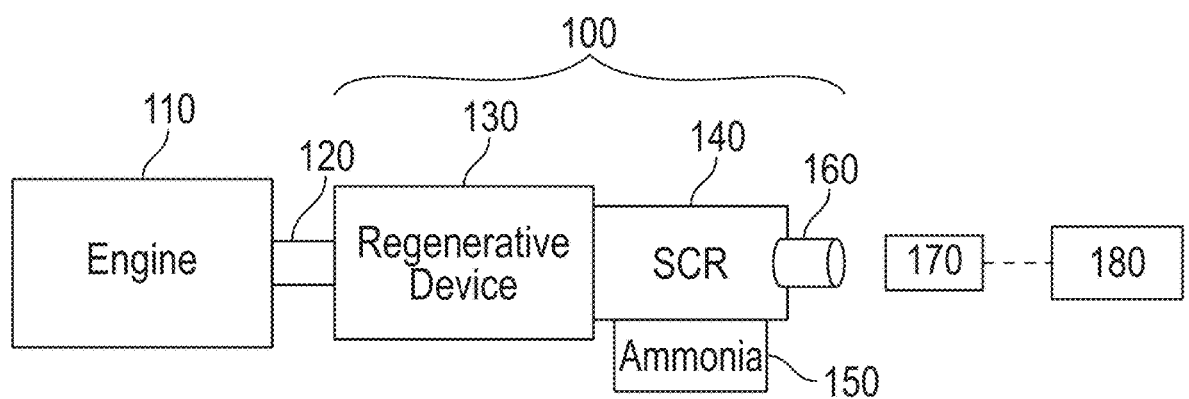
FIG. 1 illustrates a system for detecting a failed nitrogen oxide (NOx) sensor in an engine through a NOx functional test, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details.

In some instances, well-known structures and components are shown in simplified form for brevity of description. In addition, it should be understood that the various components illustrated herein are not necessarily drawn to scale. In other words, the features disclosed in various embodiments may be implemented using different relative dimensions within and between components than those illustrated in the drawings.

As used herein, a reference numeral with an appended letter will be used to refer to a specific component, whereas the same reference numeral without any appended letter will be used to refer collectively to a plurality of the component or to refer to a generic or arbitrary instance of the component. In addition, the terms "respective" and "respectively" signify an association between members of a group of first items and members of a group of second items. For example, the phrase "each component A connected to a respective component B" would signify A1 connected to B1, A2 connected to B2, and so on and so forth, up to AN connected to BN.

FIG. 1 illustrates a system for detecting a failed nitrogen oxide (NOx) sensor 170 in an engine 110 through a NOx functional test, according to an embodiment. Engine 110 is illustrated as a diesel engine. However, engine 110 can be any engine that utilizes a system for detecting a failed NOx sensor 170 in an engine 110 through a NOx functional test. Other examples of engine 110 include, without limitation, engines in excavator, dump truck, asphalt paver, backhoe loader, skid steer, track loader, cold planer, compactor, dozer, electric rope shovel, forest machine, hydraulic mining shovel, material handler, motor grader, pipe-layer, road reclaimer, telehandler, tractor-scraper, or the like. Further, engine 110 can also include gasoline engines or any other engine type that produces NOx emissions.

In the illustrated example, system for detecting a failed NOx sensor 170 in an engine 110 through a NOx functional test comprises an engine 110, exhaust system 100, a connection 120 that connects engine 110 with exhaust system 100, one or more NOx sensors, and an electronic control module (controller) 180. Exhaust system 100 in system for detecting a failed NOx sensor 170 in an engine 110 through a NOx functional test comprises a regeneration device 130, a selective catalytic reduction system (SCR) 140, an ammonia source 150, and an exhaust stream 160. However, it should be understood that disclosed embodiments do not require all embodiments to comprise a system for detecting a failed NOx sensor 170 in an engine 110 through a NOx functional test.

Engine 110 can be an internal combustion engine that operates on diesel fuel, which is a heavier and less refined fuel than gasoline. However, engine 110 is not limited to diesel. Engine 110 functions by compressing air and then injecting fuel into the compressed air at high pressure, causing the fuel to ignite due to the heat generated by compression. Engine's 110 internal combustion process drives the engine's 110 pistons, converting the chemical energy of the fuel (e.g. diesel) into mechanical energy that powers mobile equipment or machinery. Engine 110 produces several gases as byproducts of combustion. These include carbon dioxide (CO2), carbon monoxide (CO), NOx, and particulate matter (PM).

Engine 110 is connected to exhaust system 100 by connection 120. As previously mentioned, exhaust system 100 in system for detecting a failed NOx sensor 170 in an engine 110 through a NOx functional test comprises a regeneration device 130, a SCR system 140, an ammonia source 150, and an exhaust stream 160. Exhaust system 100 in system for detecting a failed NOx sensor 170 in an engine 110 through a NOx functional test manages and treats the gases produced during combustion. Exhaust system 100 directs the exhaust gases, including NOx, away from the engine and vehicle occupants. As gases flow through exhaust system 100, they pass through regeneration device 130, and after, through SCR system 140.

Regeneration device 130 in exhaust system 100, can be a diesel particulate filters (DPF) and/or a SCR catalyst. As engine 110 operates, it produces microscopic soot particles that can accumulate, gradually reducing engine 110 efficiency and potentially leading to increased exhaust backpressure and decreased engine 110 performance. Regeneration device 130 initiates a process where the collected PM is oxidized and burned off at high temperatures. Further, regeneration device 130 can produce an exothermic reaction through the heat produced through its operation. The exothermic reaction can accelerate the ammonia depletion in SCR system 140 when the NOx functional test is being performed in system for detecting a failed NOx sensor 170 in an engine 110 (see FIG. 4).

After engine's 110 exhaust is filtered by regeneration device 130 in exhaust system 100 to remove PM and other byproducts, it enters SCR system 140. SCR system 140 can be designed to reduce harmful NOx emissions. SCR system's 140 primary function is to convert nitrogen oxides, such as nitric oxide (NO) and nitrogen dioxide (NO2), into harmless nitrogen ($N_2$) and water vapor (H2O) using a chemical reaction. This chemical reaction in SCR system 140 occurs when a reductant, such as DEF, is injected into SCR system 140 through ammonia source 150. When engine's 110 exhaust gases containing NOx molecules pass over to SCR system 140, the reductant (e.g. DEF) from ammonia source 150 decomposes into ammonia (NH3), which reacts with NOx to break down the nitrogen and oxygen bonds, converting them into nitrogen and water vapor. SCR system 140 can effectively reduce NOx emissions by up to 90% or more and can be incorporated into mobile equipment and engines 110 to be in compliance with stringent emissions regulations worldwide. Further, SCR system 140 helps to reduce pollution produced by engine 110 while contributing to improved fuel efficiency and engine 110 performance.

As previously described, ammonia source 150 acts as a reductant in exhaust system 100 by injecting ammonia into SCR system 140 as it reacts with NOx to convert it into N2 and water, both harmless gases. Ammonia source 150 provides the necessary ammonia for this chemical reaction to occur effectively. An example of ammonia source 150 used in exhaust system 100 is aqueous urea solution, known as DEF or AdBlue®. DEF is a solution of urea (typically around 32.5%) in purified water. DEF decomposes into ammonia and CO2 under the high temperature conditions of SCR system 140 in exhaust system 100. The generated ammonia then reacts with NOx when injected into SCR system 140, converting them into harmless nitrogen and water vapor. After passing through the SCR system 140 in exhaust system 100, the resulting exhaust stream 160 primarily consists of N2 and water vapor.

Further, system for detecting a failed NOx sensor 170 in an engine 110 through a NOx functional test comprises NOx sensor 170. The function of NOx sensor 170 is to monitor and measure the concentration of NOx gases coming out of exhaust stream 160 emitted by engine 110. NOx sensor 170 can be used as an after-treatment control typically installed to ensure that NOx gases are not released to the atmosphere. NOx sensor 170 can provide real-time feedback to controller 180. Controller 180 can use data from NOx sensor 170 to optimize engine's 110 operation and ensure that emissions remain within legal limits. If NOx levels measured by NOx sensor 170 exceed permissible thresholds, controller 180 can adjust parameters such as fuel injection timing and exhaust gas recirculation (EGR) rates to reduce emissions and improve efficiency. Further, NOx sensor's 170 readings can indicate a system malfunction to controller 180.

System for detecting a failed NOx sensor 170 in an engine 110 through a NOx functional test can comprise a controller 180. In summary, controller 180 serves as the brain of system for detecting a failed NOx sensor 170 in an engine 110 through a NOx functional test, responsible for interpreting commands, executing tasks, and ensuring smooth operation according to predefined instructions or programmable logic. Controller 180 can integrate sensors, actuators, and interface devices to monitor conditions, receive input signals, and output commands, effectively orchestrating the precise movements and functions of system for detecting a failed NOx sensor 170 in an engine 110 through a NOx functional test components. Further, controller 180 can be in communication (e.g. wired or wireless) with ammonia source 150 and NOx sensor 170. Controller 180 details are described in FIG. 5 below.

Figure 2:
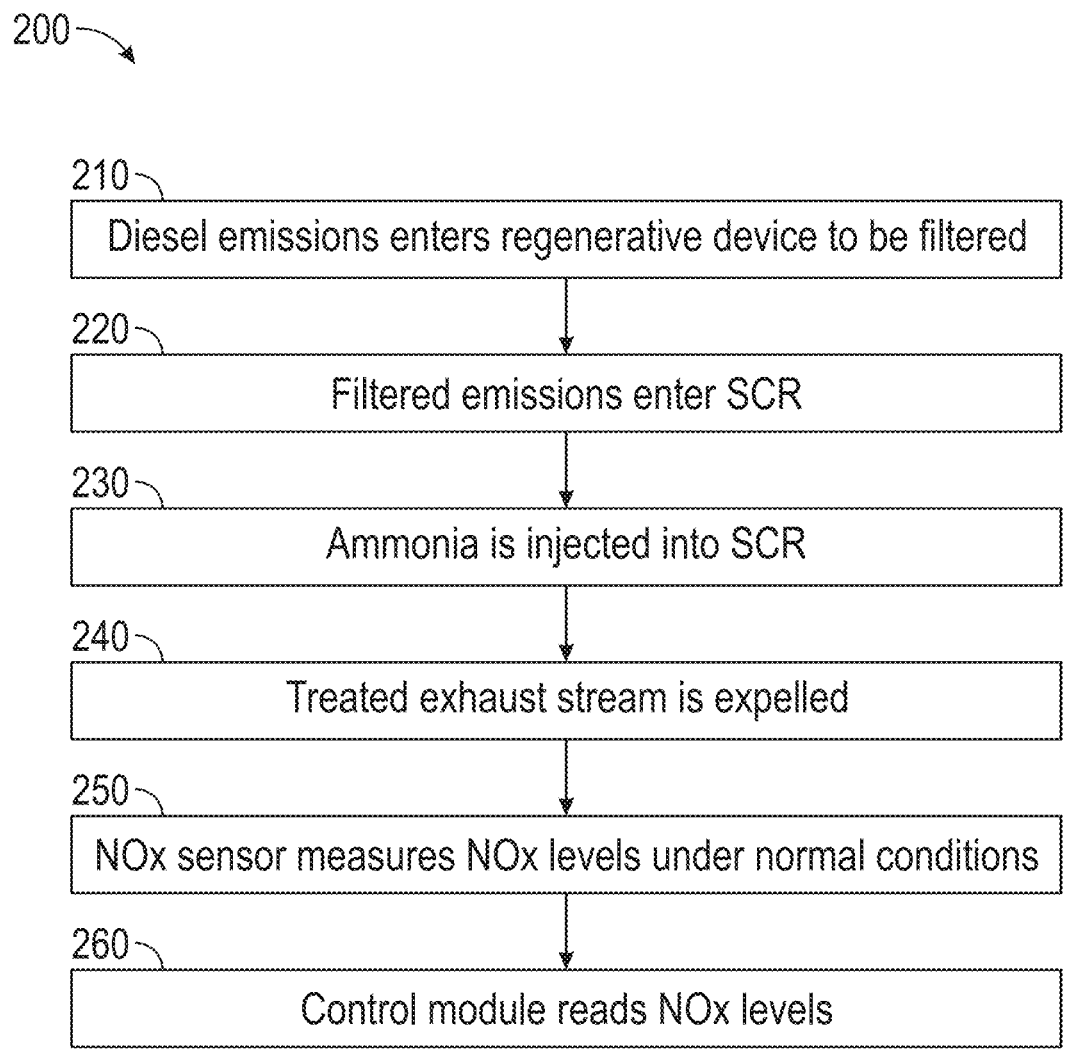
FIG. 2 illustrates a process of an engine with an exhaust system under a normal operation, according to an embodiment.

FIG. 2 illustrates a process 200 of engine 110 with exhaust system 100 under normal operation, according to an embodiment. Process 200 can be implemented by a system for detecting a failed NOx sensor 170 in engine 110 through a NOx functional test. While process 200 is illustrated with a certain arrangement and ordering of subprocesses, process 200 can be implemented with fewer, more, or different subprocesses and a different arrangement and/or ordering of subprocesses. In addition, it should be understood that any subprocess, which does not depend on the completion of another subprocess, can be executed before, after, or in parallel with that other independent subprocess, even if the subprocesses are described or illustrated in a particular order.

In subprocess 210, engine 110 combusts diesel fuel converting the chemical energy of the fuel into mechanical energy that powers mobile equipment or machinery. As a byproduct, gas emissions are generated. These gas emissions enter regeneration device 130 where PM and other byproducts are filtered. Next, in subprocess 220, the filtered emissions enter SCR system where SCR system's 140 primary function is to convert nitrogen oxides, such as nitric oxide (NO) and nitrogen dioxide (NO2), into harmless nitrogen ($N_2$) and water vapor (H2O) using a chemical reaction. In subprocess 230, the chemical reaction in SCR system 140 occurs when a reductant, such as DEF, is injected into SCR system 140 through ammonia source 150.

Figure 3:
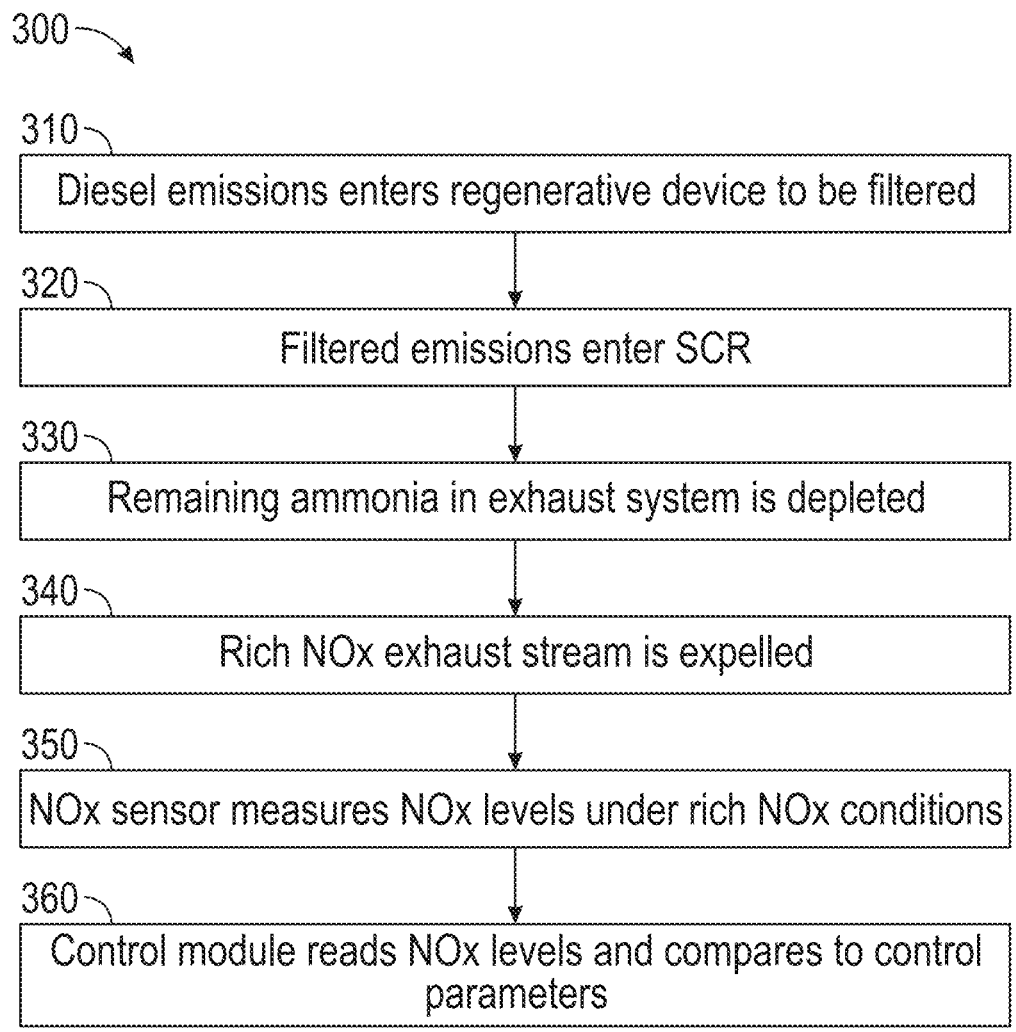
FIG. 3 illustrates a process of an engine with an exhaust system under a NOx functional test, according to an embodiment.

In subprocess 240, the ammonia treated exhaust stream 160 is expelled. Under normal conditions if a running engine 110, exhaust stream 160 should deliver emissions with low NOx gas levels (reduction of 90% or more). After, in subprocess 250, these low NOx gas level emissions are measured by NOx sensor 170. Finally, the NOx level readings measured by NOx sensor 170 are sent to controller 180 to be read, as shown in subprocess 260. Controller 180 serves as the brain of system for detecting a failed NOx sensor 170 in an engine 110 through a NOx functional test, responsible for interpreting commands, executing tasks, and ensuring smooth operation according to predefined instructions or programmable logic FIG. 3 illustrates a process 300 of engine 110 with exhaust system 100 under a NOx functional test, according to an embodiment. Process 300 can be implemented by a system for detecting a failed NOx sensor 170 in engine 110 through a NOx functional test. In summary, NOx sensor 170 functional test is a diagnostic procedure used in automotive engineering to assess the performance of NOx sensor 170 in exhaust system 100. This functional test can be implanted in one or more NOx sensors 170. While process 300 is illustrated with a certain arrangement and ordering of subprocesses, process 300 can be implemented with fewer, more, or different subprocesses and a different arrangement and/or ordering of subprocesses. In addition, it should be understood that any subprocess, which does not depend on the completion of another subprocess, can be executed before, after, or in parallel with that other independent subprocess, even if the subprocesses are described or illustrated in a particular order.

Similar to process 200, in subprocess 310, engine 110 combusts diesel fuel converting the chemical energy of the fuel into mechanical energy that powers mobile equipment or machinery. As a byproduct, gas emissions are generated. These gas emissions enter regeneration device 130 where PM and other byproducts are filtered. Next, in subprocess 320, the filtered emissions enter SCR system where SCR system's 140 primary function is to convert nitrogen oxides, such as nitric oxide (NO) and nitrogen dioxide (NO2), into harmless nitrogen ($N_2$) and water vapor (H2O) using a chemical reaction. However, during the NOx functional test, ammonia source 150 ceases to inject ammonia into SCR system 140. Controller 180 can be configured to control and limit ammonia source's 150 to supply ammonia to SCR system 140. In order to deplete ammonia from SCR system 140 completely, an exothermic reaction can accelerate the process of depletion. This exothermic reaction can be achieved through the heat generated from regeneration device 130, as shown in subprocess 330. After depleting the ammonia storage in SCR system 140, the functional test alters engine 110 operating conditions to create NOx gas outputs that are captured by SCR system 140 under normal conditions. The resulting exhaust stream 160 is a rich NOx gas emission as a result of the perturbations created by ceasing the ammonia input into SCR system 140.

In subprocess 340, the rich NOx exhaust stream 160 is expelled. After, in subprocess 350, the rich NOx gas level emissions are measured by NOx sensor 170. NOx sensors 170 should respond appropriately to these gas perturbations. If NOx sensor 170 fails to respond or overreact, it can be determined that NOx sensor 170 is not functioning correctly. Finally, the NOx level readings measured by NOx sensor 170 are sent to controller 180 to be read, as shown in subprocess 360. Similar to process 200, controller 180 serves as the brain of system for detecting a failed NOx sensor 170 in an engine 110 through a NOx functional test, responsible for interpreting commands, executing tasks, and ensuring smooth operation according to predefined instructions or programmable logic. Further, controller 180 can compare predetermined control parameters of NOx levels to determine the correct functioning of NOx sensor 170.

Figure 4:
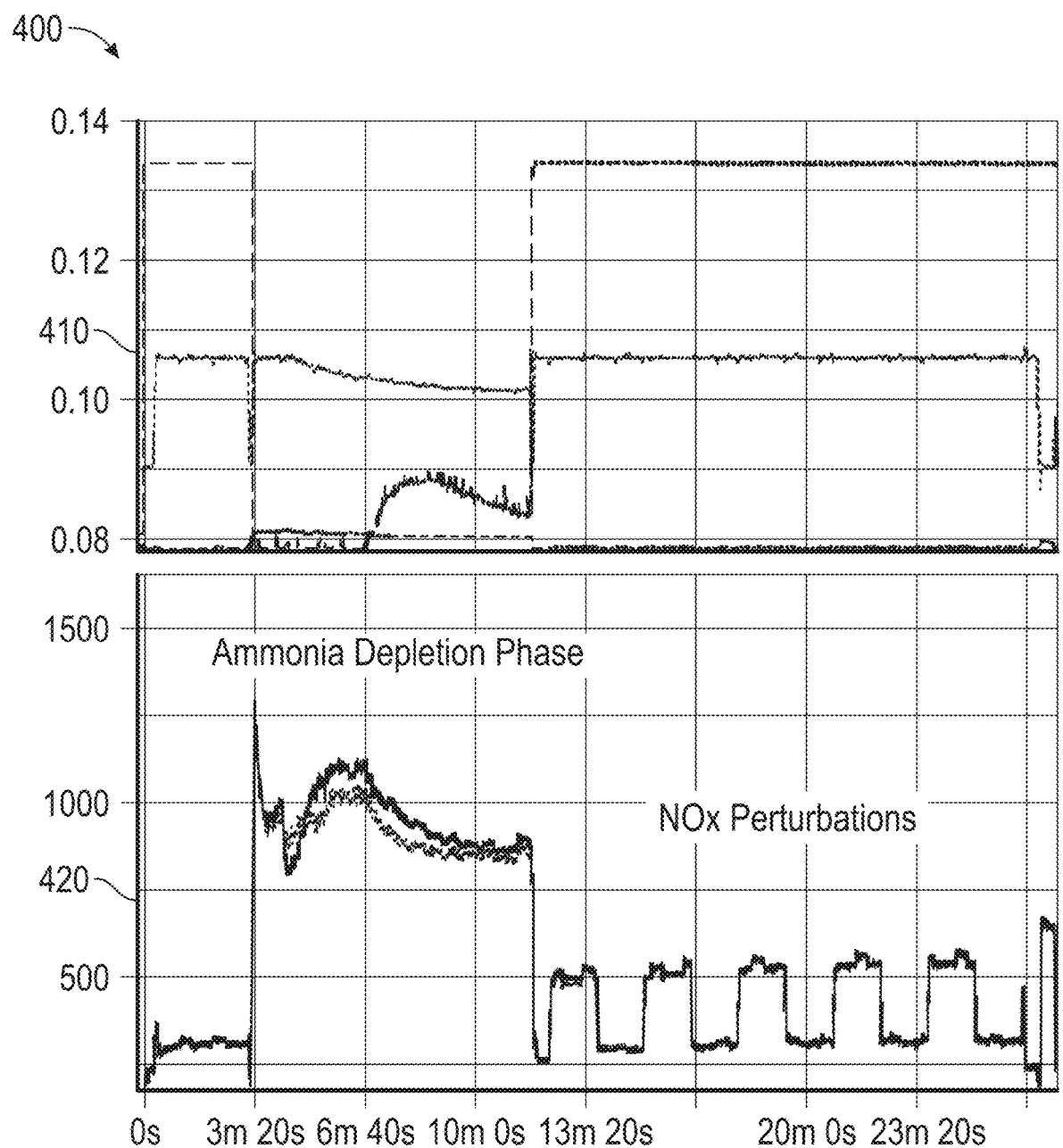
FIG. 4 illustrates a NOx parameter comparison table, according to an embodiment.

FIG. 4 illustrates a NOx parameter comparison table 400, according to an embodiment. NOx parameter comparison table 400 shows treated exhaust parameters 410 and rich NOx exhaust stream parameters 420. Treated exhaust parameters 410 exemplifies the low levels of NOx emissions from engine 110 being expelled through exhaust system 100 under normal conditions. On the other hand, rich NOx exhaust stream parameters 420 exemplify the perturbated NOx levels in the emissions from engine 110 being expelled through exhaust system 100 while performing NOx sensor 170 functional test.

In treated exhaust parameters 410, the parameters indicate low levels of NOx emissions achieved through the proper functioning of SCR system 140 and ammonia source 150. Exhaust system 100 gases contain significantly reduced amounts of NOx. As a result, exhaust stream 160 readings performed by NOx sensor 170 should indicate low NOx levels under proper functioning. Conversely, in rich NOx exhaust stream parameters 420, the parameters indicate perturbated NOx emissions from exhaust system 100 due to the NOx sensor 170 functional test being performed. This leads to higher concentrations of nitrogen oxides in the exhaust gases because ammonia from ammonia source 150 is not injected into SCR system 140 and the ammonia has been depleted from SCR system 140. These parameters serve controller 180 to determine if there is a malfunctioning with NOx sensor 170. For example, a 20% or more deviation of the one or more readings of the NOx gas output from the one or more control parameters indicates a NOx sensor 170 failure. Further, a failure or overreaction in NOx sensor 170 to respond to the NOx output can indicate a failure.

Figure 5:
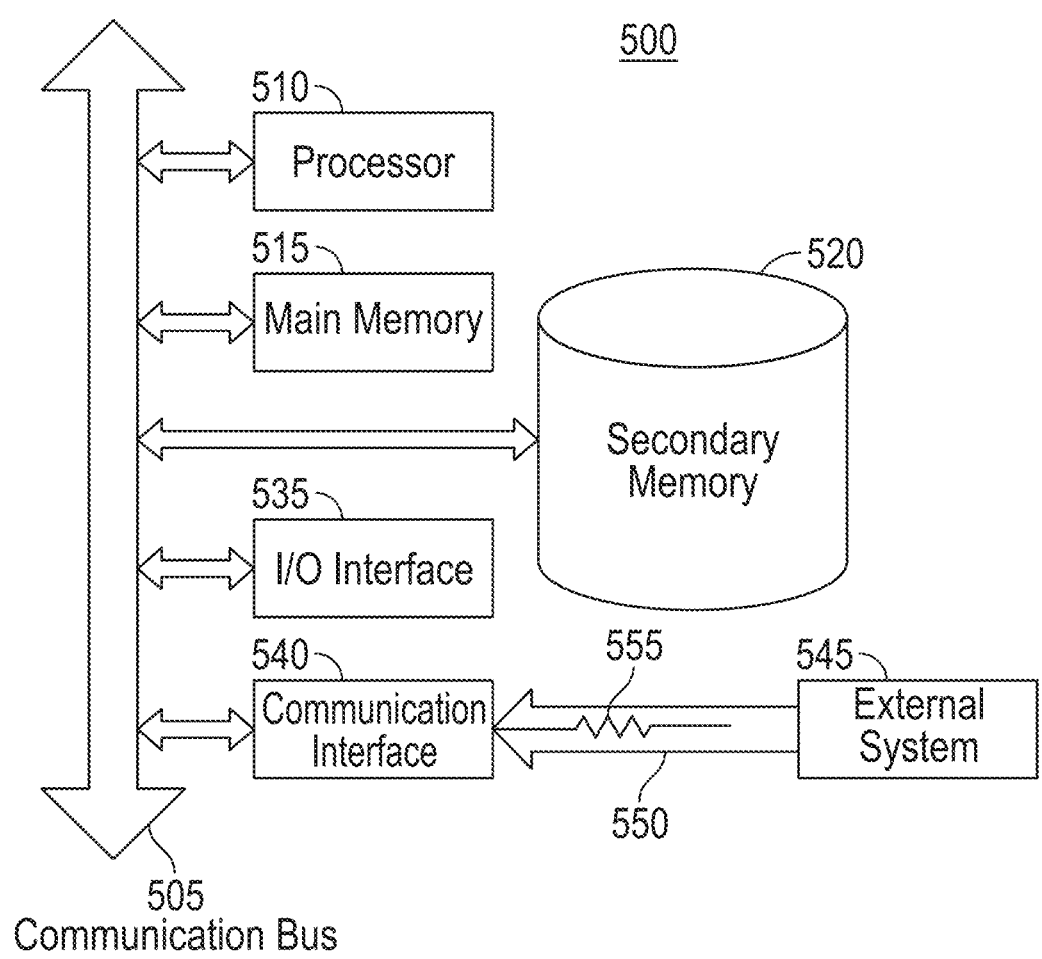
FIG. 5 illustrates a processing system that may be used to implement processes described herein, according to an embodiment.

FIG. 5 illustrates an example processing system 500 that may be used as controller 180. System 500 may comprise one or more processors 510. Processor(s) 510 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 510. Examples of processors which may be used with system 500 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 510 may be connected to a communication bus 505. Communication bus 505 may include a data channel for facilitating information transfer between storage and other peripheral components of system 500. Furthermore, communication bus 505 may provide a set of signals used for communication with processor 510, including a data bus, address bus, and/or control bus (not shown). Communication bus 505 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 500 may comprise main memory 515. Main memory 515 provides storage of instructions and data for programs executing on processor 510, such as one or more of the functions (e.g., subprocess 240) and/or modules discussed herein. It should be understood that programs stored in the memory and executed by processor 510 may be written and/or compiled according to any suitable language, including without limitation C/C++, Java, JavaScript, Perl, Python, Visual Basic, .NET, and the like. Main memory 515 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 500 may comprise secondary memory 520. Secondary memory 520 is a non-transitory computer-readable medium having computer-executable code and/or other data (e.g., any of the software disclosed herein) stored thereon. In this description, the term "computer-readable medium" is used to refer to any non-transitory computer-readable storage media used to provide computer-executable code and/or other data to or within system 500. The computer software stored on secondary memory 520 is read into main memory 515 for execution by processor 510. Secondary memory 520 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

System 500 may comprise an input/output (I/O) interface 535. I/O interface 535 provides an interface between one or more components of system 500 and one or more input and/or output devices. For example, sensor 152 may be connected to I/O interface 535 as an input, and flow valve 154 may be connected to I/O interface 535 as an output.

System 500 may comprise a communication interface 540. Communication interface 540 allows software to be transferred between system 500 and external devices (e.g., sensor 152 and/or flow valve 154), networks, or other information sources. For example, computer-executable code and/or data may be transferred to system 500, over one or more networks, from a network server via communication interface 540. Examples of communication interface 540 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 500 with a network or another computing device. Communication interface 540 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 540 is generally in the form of electrical communication signals 555. These signals 555 may be provided to communication interface 540 via a communication channel 550 between communication interface 540 and an external system 545. In an embodiment, communication channel 550 may be a wired or wireless network, or any variety of other communication links. Communication channel 550 carries signals 555 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 515 and/or secondary memory 520. Computer-executable code can also be received from an external system 545 via communication interface 540 and stored in main memory 515 and/or secondary memory 520. Such computer-executable code, when executed by processor(s) 510, enable system 500 to perform the various functions (e.g., subprocess 240) of the disclosed embodiments as described elsewhere herein.

INDUSTRIAL APPLICABILITY

NOx sensors are helpful for modern combustion engines after-treatment control. Still, their failure modes are difficult to detect during normal operation, leading to false detections of other diagnostics, reduced engine performance, and lengthy troubleshooting by servicing technicians. Embodiments of a system and method for detecting a failed NOx sensor 170 offer a variety of benefits by allowing the detection of NOx sensor 170 malfunctions through a functional test. The present embodiments eliminate or reduce the need for costly NOx sensor 170 diagnostics that can be untimely and lengthy. Further, the disclosed embodiments do not require additional devices that may not be available in all worksites. Through a functional test, controller 180 can detect and assess if there are any malfunctions in NOx sensor 170.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of engine. Hence, although the present embodiments are, for convenience of explanation, depicted and described as being implemented in a diesel engine, it will be appreciated that it can be implemented in various other types of engines that may produce NOx gas, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed:

1. A method for detecting a failure state of a nitrogen oxide (NOx) sensor in an engine, the method comprising:
    ceasing to inject ammonia from an ammonia source to a selective catalytic reduction (SCR) system;
    depleting a remaining ammonia in the SCR system so as to increase a NOx gas output downstream of the SCR system,
    sensing the increased NOx gas output via a NOx sensor positioned at an outlet of the SCR system;
    transmitting one or more NOx gas output readings from the NOx sensor to an electronic control module of the engine;
    comparing the one or more NOx gas output readings to an expected NOx gas output based on engine operating conditions via the electronic control module;
    determining the NOx sensor is in the failure state when the one or more NOx gas output readings deviate from the expected NOx gas output by a predetermined threshold amount; and
    optimizing engine operation when the NOx sensor is determined to be in the failure state.

2. The method of claim 1, wherein the remaining ammonia is depleted via a regeneration device.

3. The method of claim 2, wherein the regeneration device is a diesel particle filter arranged upstream of the SCR system.

4. The method of claim 2, wherein the regeneration device is a SCR catalyst arranged upstream of the SCR system.

5. The method of claim 1, wherein the remaining ammonia is depleted via an exothermic reaction.

6. The method of claim 1, wherein the predetermined threshold amount corresponds to a deviation of at least 20% of the expected NOx gas output.

7. The method of claim 1, further comprising determining the NOx sensor is in the failure state when the NOx sensor fails to respond to the increased NOx gas output.

8. The method of claim 1, further comprising determining the NOx sensor is in the failure state when the one or more NOx gas output readings exceed the expected NOx gas output.

9. The method of claim 1, wherein the expected NOx gas output is based on the engine operating conditions of the engine under normal operation.

10. A method for detecting a failure state of a nitrogen oxide (NOx) sensor in a diesel engine, the method comprising:
    ceasing to inject ammonia from an ammonia source to a selective catalytic reduction (SCR) system;
    depleting a remaining ammonia in the SCR system via an exothermic reaction within a regeneration device so as to increase a NOx gas output downstream of the SCR system;
    sensing the increased NOx gas output via a NOx sensor positioned at an outlet the output of the SCR system;
    transmitting one or more NOx gas output readings from the NOx sensor to an electronic control module of the engine;
    comparing the one or more NOx gas output an expected NOx gas output based on engine operating conditions via the electronic control module;
    determining the NOx sensor is in the failure state when the one or more NOx gas output readings deviate from the expected NOx gas output by a predetermined threshold amount; and
    optimizing engine operation when the NOx sensor is determined to be in the failure state.

11. The method of claim 10, wherein the regeneration device is a diesel particle filter arranged upstream of the SCR system.

12. The method of claim 10, wherein the regeneration device is a SCR catalyst arranged upstream of the SCR system.

13. The method of claim 10, wherein the predetermined threshold amount corresponds to a deviation of at least 20% of the expected NOx gas output.

14. The method of claim 10, further comprising determining the NOx sensor is in the failure state when the NOx sensor fails to respond to the increased NOx gas output.

15. The method of claim 10, further comprising determining the NOx sensor is in the failure state when the one or more NOx gas output readings exceed the expected NOx gas output.

16. The method of claim 10, wherein the expected NOx gas output is based on the engine operating conditions of the engine under normal operation.

17. A system for detecting a failure state of a nitrogen oxide (NOx) sensor in an engine, the system comprising:
   a selective catalytic reduction (SCR) system;
   an ammonia source configured to inject ammonia into the SCR system;
   a regeneration device configured to deplete ammonia in the SCR system;
   a NOx sensor positioned at an outlet of the SCR system; and
   an electronic control module in communication with the engine, the ammonia source, the regeneration device, and the NOx sensor, the electronic control module configured to:
   instruct the ammonia source to cease injecting ammonia into the SCR system;
   instruct the regeneration device to deplete ammonia remaining in the SCR system so as to increase a NOx gas output downstream of the SCR system;
   receive one more NOx sensor signals from the NOx sensor indicative of the increased NOx gas output;
   compare the one more NOx sensor signals to an expected NOx gas output based on engine operating conditions;
   determine the NOx sensor is in the failure state when the one or more NOx sensor signals deviate from the expected NOx gas output by a predetermined threshold amount; and
   optimize engine operation when the NOx sensor is determined to be in the failure state.

18. The system of claim 17, wherein the electronic control module is further configured to determine the NOx sensor is in the failure state when the NOx sensor fails to respond to the increased NOx gas output.

19. The system of claim 17, wherein the electronic control module is further configured to determine the NOx sensor is in the failure state when the one or more NOx sensor signals exceed the expected NOx gas output.

20. The system of claim 17, wherein the regeneration device is a diesel particle filter arranged upstream of the SCR system.

* * * * *